United States Patent
Van Giel et al.

(10) Patent No.: US 10,753,102 B2
(45) Date of Patent: Aug. 25, 2020

(54) COVERING PANEL AND PROCESS OF PRODUCING COVERING PANELS

(71) Applicant: Beaulieu International Group NV, Waregem (BE)

(72) Inventors: Frans Van Giel, Kortrijk (BE); Pol Lombaert, Nazareth (BE); Matthias Wyseur, Roeselare (BE); Leo Marie Richard Bevernage, Avelgem (BE)

(73) Assignee: Beaulieu International Group NV, Waregem (BE)

( * ) Notice: Subject to any disclaimer, the term of this patent is extended or adjusted under 35 U.S.C. 154(b) by 0 days.

(21) Appl. No.: 15/543,393

(22) PCT Filed: Jan. 15, 2016

(86) PCT No.: PCT/EP2016/050733
§ 371 (c)(1),
(2) Date: Jul. 13, 2017

(87) PCT Pub. No.: WO2016/113377
PCT Pub. Date: Jul. 21, 2016

(65) Prior Publication Data
US 2018/0002932 A1  Jan. 4, 2018

(30) Foreign Application Priority Data
Jan. 16, 2015 (EP) .................... 15151551

(51) Int. Cl.
| | | |
|---|---|---|
| *E04F 13/16* | (2006.01) | |
| *B32B 27/20* | (2006.01) | |
| *C08J 9/00* | (2006.01) | |
| *C08K 3/34* | (2006.01) | |
| *E04B 9/04* | (2006.01) | |
| *E04F 15/10* | (2006.01) | |
| *B32B 27/08* | (2006.01) | |
| *B32B 27/30* | (2006.01) | |
| *C08K 3/26* | (2006.01) | |
| *B32B 3/06* | (2006.01) | |
| *B32B 5/02* | (2006.01) | |
| *B32B 5/08* | (2006.01) | |
| *B32B 5/20* | (2006.01) | |
| *B32B 5/24* | (2006.01) | |
| *B32B 7/12* | (2006.01) | |
| *B32B 21/08* | (2006.01) | |
| *B32B 21/14* | (2006.01) | |

(52) U.S. Cl.
CPC .............. *E04F 13/16* (2013.01); *B32B 27/08* (2013.01); *B32B 27/20* (2013.01); *B32B 27/30* (2013.01); *B32B 27/304* (2013.01); *C08J 9/0066* (2013.01); *C08K 3/26* (2013.01); *C08K 3/346* (2013.01); *E04B 9/045* (2013.01); *E04F 15/102* (2013.01); *B32B 3/06* (2013.01); *B32B 5/022* (2013.01); *B32B 5/08* (2013.01); *B32B 5/20* (2013.01); *B32B 5/245* (2013.01); *B32B 7/12* (2013.01); *B32B 21/08* (2013.01); *B32B 21/14* (2013.01); *B32B 2419/04* (2013.01); *B32B 2471/00* (2013.01); *C08K 2003/265* (2013.01); *Y02P 20/582* (2015.11)

(58) Field of Classification Search
CPC ...... E04F 13/16; E04F 15/102; B32B 27/304; B32B 27/08; B32B 27/30; B32B 27/20; B32B 2471/00; B32B 2419/04; E04B 9/045; C08K 3/346; C08K 3/26; C08K 2003/265; C08J 9/0066; Y02P 20/582
USPC ..................................................... 52/506.06
See application file for complete search history.

(56) References Cited

U.S. PATENT DOCUMENTS

| | | | | |
|---|---|---|---|---|
| 2,071,779 A | * | 2/1937 | Willing | .............. E02B 3/125 |
| | | | | 405/19 |
| 2,263,193 A | * | 11/1941 | Schatzkin | ......... E04F 13/0862 |
| | | | | 428/136 |
| 3,560,322 A | * | 2/1971 | Magid | .................. A41D 31/02 |
| | | | | 428/160 |
| 3,597,297 A | * | 8/1971 | Buchholtz | ............... C08J 9/00 |
| | | | | 156/72 |
| 3,640,829 A | * | 2/1972 | Elton | .................. B32B 38/06 |
| | | | | 428/315.7 |
| 3,648,845 A | * | 3/1972 | Riley | ................ B01D 67/0009 |
| | | | | 210/490 |
| 4,262,108 A | * | 4/1981 | Blount | ............ C08G 18/6484 |
| | | | | 521/110 |
| 5,194,189 A | * | 3/1993 | Papastavros | ....... B29C 70/504 |
| | | | | 156/273.3 |

(Continued)

FOREIGN PATENT DOCUMENTS

| | | |
|---|---|---|
| CN | 102464841 A | 5/2012 |
| CN | 102918101 A | 2/2013 |

(Continued)

OTHER PUBLICATIONS

NPL English translation of the above DE 3025748 patent.*
Specialty Minerals: "Super Pflex", Nov. 1, 2015, Retrieved from the Internet.

(Continued)

*Primary Examiner* — Jeanette E Chapman
(74) *Attorney, Agent, or Firm* — James Creighton Wray

(57) ABSTRACT

The present invention provides a covering panel, such as a floor panel, wall panel or ceiling panel, comprising a substrate and optionally a top layer, whereby said substrate comprises a synthetic material and a filler material, whereby said filler material is comprised in an amount from 15 to 75 wt. % based on the total weight of said substrate. In addition, the present invention provides a process of producing such covering panels.

16 Claims, No Drawings

(56) References Cited

U.S. PATENT DOCUMENTS

| | | | | |
|---|---|---|---|---|
| 5,458,840 | A * | 10/1995 | Carmien | B25G 3/12 264/221 |
| 6,465,091 | B1 * | 10/2002 | Ou-Yang | C09J 7/401 428/352 |
| 8,841,000 | B2 * | 9/2014 | Gong | C23C 18/2006 427/554 |
| 9,573,343 | B2 * | 2/2017 | Pervan | B32B 37/1027 |
| 9,928,821 | B2 * | 3/2018 | Kosonen | C08K 7/02 |
| 9,944,063 | B1 * | 4/2018 | Lakrout | B32B 37/14 |
| 2001/0033919 | A1 * | 10/2001 | Muller | B32B 27/06 428/209 |
| 2002/0096278 | A1 | 7/2002 | Foster | |
| 2006/0258241 | A1 * | 11/2006 | Roseen, Jr. | B29C 70/00 442/110 |
| 2006/0264556 | A1 * | 11/2006 | Lustiger | B62D 29/043 524/451 |
| 2007/0078191 | A1 | 4/2007 | Guhde | |
| 2010/0065271 | A1 * | 3/2010 | McCrary | C09K 8/805 166/278 |
| 2011/0167744 | A1 | 7/2011 | Whispell | |
| 2012/0048449 | A1 * | 3/2012 | Manzke | B29C 65/06 156/73.5 |
| 2012/0135203 | A1 * | 5/2012 | Albert | B32B 5/02 428/192 |
| 2014/0290158 | A1 | 10/2014 | Meersseman | |
| 2014/0350143 | A1 * | 11/2014 | Kikuchi | B29B 9/14 524/35 |
| 2014/0352248 | A1 | 12/2014 | Whispell | |
| 2015/0045490 | A1 * | 2/2015 | Riebel | C08K 5/103 524/313 |
| 2016/0063984 | A1 * | 3/2016 | Kosonen | C08K 7/02 252/62 |
| 2017/0370109 | A1 * | 12/2017 | Devos | E04F 15/02038 |
| 2018/0266121 | A1 * | 9/2018 | Meersseman | E04F 15/107 |
| 2019/0023061 | A1 * | 1/2019 | Buhlmann | B44C 5/043 |
| 2019/0136545 | A1 * | 5/2019 | De Rick | E04F 15/02038 |
| 2020/0011069 | A1 * | 1/2020 | Van Hooydonck | E04F 15/105 |

FOREIGN PATENT DOCUMENTS

| | | | | |
|---|---|---|---|---|
| DE | 3025748 | A1 * | 1/1982 | B29C 48/022 |
| GB | 1432618 | A | 4/1976 | |
| GB | 2376916 | A | 12/2002 | |
| JP | 2005068249 | A * | 3/2005 | |
| JP | 2005139221 | A | 6/2005 | |
| KR | 20040004772 | A | 1/2004 | |
| RU | 2212421 | C2 | 9/2003 | |
| WO | 2013026559 | A2 | 2/2013 | |
| WO | 2013118030 | A2 | 8/2013 | |
| WO | 2014108465 | A1 | 7/2014 | |

OTHER PUBLICATIONS

S. Rimdusit et al., "Polybenzoxazine Alloys"; Alloys and Composites of Polybenzoxazines, Engineering Materials, DOI: 10.1007/978-981-4451-76-5)2.

\* cited by examiner

COVERING PANEL AND PROCESS OF PRODUCING COVERING PANELS

This application claims the benefit of European Application No. 15151551.7 filed Jan. 16, 2015, and PCT/EP2016/050733 filed Jan. 15, 2016, International Publication No. WO 2016/113377 A1, which are hereby incorporated by reference in their entirety as if fully set forth herein.

TECHNICAL FIELD

The present invention relates to the field of covering panels and processes of producing covering panels.

INTRODUCTION

Covering panels such as floor panels, wall panels and ceiling panels can be obtained by laminating or calendaring multiple layers onto each other, whereby each layer is provided with a specific functionality. Such panels are known in the state of the art.

I.e. WO 2013/026559 describes a floor panel in the form of a multilayer, rectangular laminate with a soft core of plastic, a decor film on the upper side of the core, a transparent finishing layer and a transparent lacquer layer applied on the finishing layer, as well as a back-pull layer on the back of the core, with a lockable tongue and groove connection at least at two mutually opposite edges of the panel.

Other technologies provide panels with a distinctly different composition. WO 2014/108465 discloses a specific composition comprising at least propylene-based elastomer and polymer-containing waste of floor covering, preferably polypropylene-containing carpet waste; and a surface covering in the form of a sheet, a panel, a tile or a plank, in particular for covering a floor, wall, or ceiling in interior or exterior application, comprising the composition.

An important shortcoming of covering panels according to the state of the art, however, is a definite tendency to curling. Curling is often observed in sheet-type articles which have a non-uniform composition and/or contain zones of internal stress built up during processing. More specifically for laminate covering panels, it is believed that upon changing temperatures of a multilayer laminate, different degrees of shrinking and/or expansion of the separate layers constituting the multilayer laminate imparts either a positive or negative curling of the laminate product. Due to curling, installed panels tend to become non-flat, decouple from each other, leading to issues of visual aspect such as for example gaps between panels. Furthermore, such panels suffer from impaired adhesion to the subsurface and can delaminate in case of laminate panels. Other shortcomings relate to difficulties in cutting the panel material during installation to provide correct dimensions, and issues related to mechanical strength, sound and heat insulation and/or water resistant properties, and density or weight of the panel, which is of importance during transport and installation.

SUMMARY OF THE INVENTION

The current invention provides in a solution for at least one of the above mentioned problems by providing a covering panel and process of producing covering panels, as described in the claims.

In a first aspect, the present invention provides a covering panel, such as a floor panel, wall panel or ceiling panel, comprising at least one substrate and optionally a top layer, whereby said substrate comprises a synthetic material and a filler material, whereby said substrate comprises said filler material in an amount from 15 to 75 wt. % based on the total weight of said substrate.

The substrate has a high rigidity which exhibits a reduced amount of curling of the finished covering panel. The feature of curling of the covering panel is undesired since it limits the feasibility and durability of the panel for use as a floor, wall or ceiling surface covering panel.

The inventors have surprisingly found that the degree of curling can be suppressed significantly by providing a covering panel with an optimised amount of filler material according to the invention.

In a second aspect, the present invention provides a process of producing covering panels, such as floor panels, wall panels or ceiling panels, each covering panel comprising at least one substrate and optionally a top layer, whereby said at least one substrate comprises a synthetic material and a filler material; the method comprising the steps of:
  mixing said synthetic material and said filler material, thereby obtaining a mixture;
  extrusion of said mixture, thereby obtaining a substrate;
  optionally, laminating said substrate to a top layer;
thereby obtaining a covering panel, whereby said filler material is mixed with said synthetic material in an amount from 15 to 75 wt. % based on the total weight of said mixture.

DETAILED DESCRIPTION OF THE INVENTION

The recitation of numerical ranges by endpoints includes all numbers and fractions subsumed within that range, as well as the recited endpoints. All percentages are to be understood as percentage by weight and are abbreviated as "wt. %", unless otherwise defined or unless a different meaning is obvious to the person skilled in the art from its use and in the context wherein it is used.

1. Covering Panel

The present invention relates to surface coverings, such as floor coverings, constructed of rigid panels or tiles that can be assembled together for example by mechanical connections. Panels alone are often referenced herein for the sake of simplifying the discussion. Wherever "panels" of the present invention are referenced herein, the description thereof can be understood to apply equally to "tiles" unless indicated otherwise.

The covering panel of the present invention can be any surface covering, such as a floor panel, wall panel, ceiling panel, and the like. The covering panel can be used essentially in any room in a house or work environment, including the kitchen, bathroom, living room, dining room, recreation room, garage, and outside living spaces, such as a porch, deck, shed, terrace, summerhouse, and the like. The covering panels of the present invention can be used in an indoor or outdoor applications, especially since the covering panels of the present invention are water resistant and do not swell when wet. In fact, the swelling of the surface coverings of the present invention is negligent (e.g., zero or zero to less than 0.01 mm or 0.0001 mm to less than 0.001 mm) when tested at LF 3.2 of NALFA LF 01-2003. Thus, the panel being water resistant, can be used indoors or outdoors. For instance, the panels are water resistant such that they will not swell when immersing in water for several hours. Further, the panels are resistant to various chemicals and detergents and, therefore, can even be used in industrial, recreational, or garage environments.

When the substrate of the invention is provided in laminate form, the laminate structure of the panel comprises different layers of plastic materials. It has excellent sound absorbing properties. The layers, especially the structure and composition of the substrate, contribute to the sound absorbing function, so that the panel has an excellent quality under this aspect.

The definition of the phrase "laminate" as used in the present invention should be understood in the wider sense of the word, implying that a laminate constitutes two or more strata of materials. These materials may have different mechanical properties such as, but not limited thereto; opacity, density, elastic modulus, elastic compression modulus, material composition, thermal conductivity, electrical conductivity, abrasion resistance, etc.

The covering panel can have any suitable length and/or width and can be provided in any shape, such as a rounded shape and a polygonal shape (triangle, rectangle, square, pentagon, hexagon, heptagon or octagon). Preferably, the covering is provided in the shape of a square or a rectangle. The panels of the present invention can also have a three dimensional shape, such as a corner-type shape which can usefully be employed as a panel connection between surfaces which are perpendicular to each other for use in, for example, wall and ceiling coverings with a printed design and an embossed surface, and even stairs. In one preferred embodiment, the panel can be formed as a rectangle with two pairs of opposing sides wherein the pairs of sides can be the same or different in length relative to each other. In one example, the panel is rectangular. The rectangular panel can have opposite shorter sides having a width, for example, of from 10 cm to 50 cm, preferably from 10 cm to 30 cm or other widths, and opposite longer sides having a length, for example, of from 50 cm to 300 cm, preferably from 80 cm to 250 cm or other lengths. In one example, the panel also may be square shaped, and have four sides of equal length. In some examples, surface coverings of the present invention can be, for example, square shaped panels. The sizes of the present panels are not necessarily limited with respect to larger sizes other than possibly by practical considerations such as respect to handling, etc. The smaller sizes of the panels should adequately allow for the formation and use of the profiled edges on the panel. In some examples, the panels have square shapes with a side length of from 20 cm to 100 cm, preferably from 25 cm to 80 cm, more preferably from 30 cm to 60 cm, or other side lengths.

The covering panel according to the present invention may further comprise coupling parts for assembling several panels together. Coupling mechanisms have been widely used for many years and are well known to the artisan. Most popular coupling parts are glueless locking systems where both horizontal and vertical locking of the panels are realised with a tongue along one (edge) side and a groove along the opposite (edge) side of the panel. Typically tongue and groove locking systems are integrally made with the panel. An alternative locking system comprises a plurality of staggered hooking tongues, extending outwardly from the edges of the panel. Such a system is for example described in European patent application number 15151551.7, assigned to BerryAlloc NV.

In a first aspect, the present invention provides a covering panel, such as a floor panel, wall panel or ceiling panel, comprising at least one substrate and optionally a top layer, whereby said substrate comprises a synthetic material and a filler material, whereby said substrate comprises said filler material in an amount from 15 to 75 wt. % based on the total weight of said substrate.

This is advantageous, because the optimised amount of filler material provides a substrate with high rigidity which exhibits a reduced amount of curling of the finished covering panel. The effect of curling of the covering panel is undesired since it limits the feasibility and durability of the panel for use as a floor, wall or ceiling surface covering panel. Ideally, such panels remain flat for long periods of time under conditions of varying exposure to humidity, water and temperature.

The substrate has a high rigidity, which imparts a reduced amount of curling of the finished covering panel. The feature of curling of the covering panel is undesired since it limits the feasibility and durability of the panel for use as a floor, wall or ceiling panel.

Without limiting to any theoretic or mechanistic implications, it is believed that due to non-uniform technical characteristics of a layer, and in case of laminate upon exposure to temperature differences, different degrees of shrinking and/or expansion of the separate layers constituting the multilayer laminate, impart either a positive or negative curling of the product, such as a covering panel.

Faced with the problem of curling of a covering panel, the person skilled in the art would be tempted to introduce a reinforcing layer, i.e. a glass fibre nonwoven, in order to enhance rigidity of the covering panel, thereby reducing any curling effects. The inventors have surprisingly found that the degree of curling can be suppressed significantly by providing a covering panel with an optimised amount of filler material according to the invention.

Another important advantage of the present panel is that it can be cut with a sharp strong knife. No saw is necessary to cut the panel into pieces, because it only comprises layers of plastic materials. This makes the installation process very easy even for inexperienced persons. In most cases even cutting at the surface of the panel is sufficient to create a weakening line at the upper surface of the panel so that it can be broken along this line afterwards.

In a preferred embodiment, the substrate is comprised with a thickness of 1 mm to 5 mm. In one embodiment, the substrate is comprised with a thickness of 1.0 mm to 2.5 mm, and more preferably with a thickness of 1.5 mm to 2.0 mm. Such covering panels can be usefully employed, i.e. for wall covering or ceiling panels where requirements for very high mechanical strength is limited. In one embodiment, the substrate is comprised with a thickness of 2.5 mm to 4.5 mm, and more preferably with a thickness of 3.0 mm to 4.0 mm. Such covering panels can be usefully employed, i.e. for floor panels where requirements for mechanical strength are high, but where the specific surface weight (gsm) of the panel is preferably low in order to allow for an environmentally friendly transport and ease during installation.

1.1 Synthetic Material

The term "synthetic material" as used in the context of the current invention, is to be understood as comprising one polymer or a blend of two or more polymers. The synthetic material can be comprised of any one or more polymers. For instance, the synthetic material can be comprised of a thermoplastic or thermoset polymer. The synthetic material can be comprised of any polymer, including mixtures of natural and synthetic polymers. The synthetic material can be, for example, a thermoplastic polymer, a thermosetting polymer, a rubber (elastomer), or any combinations thereof. Further, the synthetic material can be comprised of, for example, any type of polymer, such as a homopolymer, a copolymer, a random polymer, alternating polymer, graft polymer, block polymer, star-like polymer, comblike polymer, crosslinked polymer, and/or vulcanized polymer. The synthetic material can be comprised of one or more polyblends. The synthetic material can be, for example, comprised of a thermoplastic elastomer (TPE), an interpenetrating polymer network (IPN); simultaneous interpenetrating polymer network (SIN); or interpenetrating elastomeric network (IEN).

In a preferred embodiment, the present invention provides a covering panel according to the first aspect of the invention, whereby said synthetic material is a thermoplastic material or thermosetting material or mixtures thereof.

The synthetic material can be, for example, comprised of a silicone-containing polymer, for instance, polydimethyl siloxane, fluorosilicones, silicone-organic polymers, or silicone-organic hybrid polymers. Other examples of synthetic materials include, but are not limited to, olefin-containing, diene-containing and butene-containing polymers and copolymers. Examples of elastomers comprise solution styrene-butadiene rubber (SBR), natural rubber, emulsion SBR, polybutadiene, polyisobutylene, polyisoprene, polychloroprene, NBR, EPDM, EPM, isobutene elastomers, and their functionalized or modified derivatives or blends thereof. Other examples of polymers include, but are not limited to, linear and nonlinear polymers such as polyethylene, poly (vinylchloride), polyisobutylene, polystyrene(s), polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyphenylene oxides, polyurethanes, thermoplastic elastomers, polyolefins (such as polyethylene, 1-butene, polypropylene, 1-hexene, 1-octene, 4-methyl-1-pentene, substituted alpha-olefins, and the like), polyolefin copolymers (such as copolymers of: ethylene, 1-butene, propylene, 1-hexene, 1-octene, 4-methyl-1-pentene and substituted alpha-olefins and the like), polyolefin terpolymers, polycarbonates, silicone polymers, alkyd, epoxy, unsaturated polyester, vinyl ester, urea-, melamine-, or phenol-formaldehyde resins, and the like. Other examples of the polymer can be an acrylic polymer, a methacrylic polymer, or a styrenic polymer or silicone polymer. The polymer present in the synthetic material of the present invention can be a polyolefin. The molecular weight of the polymer can be, for example, from 10,000 to 1,000,000, or from 50,000 to 500,000, or from 100,000 to 200,000, or other values, based on weight average molecular weight.

In one particular example, the polymeric material is a thermoplastic polymer that includes, but is not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as polycarbonate, polyimide, polysulfone, and polyphenylene oxide and sulfide resins and the like.

In a preferred embodiment, said thermoplastic material is comprised of a polymer or a blend of two or more polymers with a high degree of amorphous phase and a low degree of crystallinity as determined by Differential Scanning calorimetry in a nitrogen atmosphere from room temperature to 250° C. with the temperature increasing by 10° C./min., measured according to ISO 11357-2. In a preferred embodiment, said polymer or a blend of two or more polymers is comprised with a degree of crystallinity of less than 40% as measured by Differential Scanning calorimetry. More preferably, said degree of crystallinity is less than 20% and even more preferably less than 10%. Most preferably, said degree of crystallinity is 0%, 2%, 4%, 6%, 8%, 10%, or any value there in between. This is advantageous because a thermoplastic material comprising a polymer or a blend of two or more polymers with a high degree of amorphous phase shows a reduced degree of shrinking during cooling of the thermoplastic melt and exhibits an enhanced dimensional stability. Furthermore, such polymers or blend of polymers show good impact resistance as well as excellent processability during secondary processing, such as bending fabrication and high-frequency bonding.

The synthetic material to be processed can be in powder, liquid, cubed, pelletized form or any other extrudable form. Also, the synthetic material can be virgin, recycled, or a mixture of both. Furthermore, the synthetic material can be incorporated with a blowing agent(s) or a mechanically injected gas or a supercritical fluid such as supercritical carbon dioxide during the extrusion process to make a cellular foam structure.

The synthetic material used to form the substrate, which can be polyvinyl chloride, can be a suspension grade or mass polymerization grade homopolymer resin having a preferred molecular weight as reflected by their K-value. The K-value of a polymer is a measure for the polymer chain length and is described in detail by K. Fikentscher in "Cellulosechemie", 13, 58 (1932). A preferred K-value of a polymer in a synthetic material is comprised between 60 and 70, and preferably the molecular weight distribution and particle size distribution are narrow in order to provide a good balance between processability and material properties. Also, high porosity and uniform porosity of the resin particles are preferred to optimize compounding and processing aspects, including the fast and uniform absorption of any stabilizer that is present as well as other ingredients during compounding. A synthetic material compound used to form the substrate can be a PVC powder compound that has good impact strength, ease of processing, high extrusion rate, good surface properties, excellent dimensional stability, and indentation resistance.

In one example, the synthetic material can comprise a vinyl chloride homopolymer and a vinyl copolymer, such as a vinyl chloride-vinyl acetate copolymer, wherein the vinyl chloride homopolymer can be present in the composition in an amount from about 1 wt. % to greater than 50 wt. % of the combined amount of vinyl chloride homopolymer and a vinyl copolymer, such as vinyl chloride-vinyl acetate copolymer (e.g., from about 1 wt. % to about 20 wt. %, from about 20 wt. % to about 40 wt. %, from about 40 wt. % to about 60 wt. %, from about 60 wt. % or greater, about 65 wt. % or greater, about 70 wt. % or greater; or from about 75 wt. % to about 99 wt. %). As a non-limiting example, the amount of vinyl chloride homopolymer in the virgin polymer can be from about 80 wt. % to about 99 wt. % of the combined amount of vinyl chloride homopolymer and vinyl chloride-vinyl acetate copolymer, or may be from about 70 wt. % to 99 wt. % (or more) of the combined amount of vinyl chloride homopolymer and vinyl chloride-vinyl acetate copolymer or may be from about 80 wt. % to 90 wt. % of the combined amount of vinyl chloride homopolymer and vinyl chloride-vinyl acetate copolymer. The vinyl chloride copolymer and homopolymer can have any K-value or molecular weight, and preferably have a K-value between 50 and 70, more preferably between 55 and 65 and most preferably of 56, 58, 60, 62 or 64, or any value there in between.

1.2 Filler Material

The substrate further comprises at least one filler or filler source such as post-industrial recycled or post-consumer recycled materials such as gypsum, glass, energy by-products, wood, plastic, or parts thereof, PVC, VCT recycled, and the like, or all of these.

The filler can further include any other filler, including any conventional filler, which can be used in solid vinyl tiles, and/or rubber compositions. The filler can be natural filler or synthetic filler. The filler can be in the form of particles, short fibres, flakes, and other discrete forms. In a panel having a substrate, inorganic filler is preferably used. Examples of inorganic filler can include, but are not limited to, hydrated alumina, magnesium carbonate, calcium sulfate, silica, precipitated silica, fumed silica, fly ash, cement dust, glass, clay, chalk, limestone, marble, talc, calcium carbonate, barium sulfate, silicates, aluminium trihydrate, kaolin, wollastonite, gypsum, solid or hollow glass microspheres, and the like. Inorganic fillers can be, for example, mineral fillers. The filler also can be non-mineral or organic filler such as carbon black, wood flour, cellulose-derived materials, ground rice hulls, solid or hollow temperature resistant polymer microspheres or microbeads (e.g., phenolic microspheres), and the like. Carbon black, for example, can be used as filler in rubber-based substrate, or other types of substrate panels. The inorganic and organic fillers can be used in combinations in the substrate, or either type can comprise the sole type of filler used in the substrate.

In a preferred embodiment, the synthetic material further comprises natural fibres, preferably natural fibres derived from plant origin, such as fruit fibres, such as coconut (coir) fibres; seed fibres, such as cotton fibres, kapok fibres; bast fibres, such as flax fibres, hemp fibres, jute fibres, ramie fibres, rattan fibres, vine fibres; leaf fibres, such as sisal fibres, banana fibres, agave fibres, abacá fibres; and stalk fibres, such as wheat fibres, rice fibres, barley fibres, tree wood fibres, grass fibres, bamboo fibres. In a preferred embodiment, said natural fibres comprise cellulose fibres such as cotton and flax, hemicellulose fibres and/or processed cellulose fibres such as rayon, viscose and cellulose-acetate fibres. In many cases, these fibres can provide an alternative to generally used reinforcement layers such as, i.e. glass fibre layers, and thus offer an environmentally benign alternative to glass fibres. In addition, carefully selected natural fibres such as tree wood fibres allow to provide for a natural look, and when comprised in high amounts in said synthetic material as to partially penetrate the surface, even a natural feel of the accordingly obtained substrate. In a preferred embodiment, said natural fibres are comprised in an amount of 1 wt. % to 20 wt. %, based on the total weight of said substrate. More preferably, said natural fibres are comprised in an amount of 2 wt. % to 5 wt. %.

As indicated, an inorganic filler is preferably used in a substrate. An inorganic filler typically provides dimensional stability and reduced elasticity to a vinyl tile, and may provide properties of fire resistance. As a non-limiting example, limestone (e.g., calcium carbonate with magnesium carbonate) may be used as the filler. As a preferred, non-limiting example, an inorganic filler can be used for the full amount of filler described for a substrate formulation herein, or other proportions (e.g., at least about 50 wt. %, or at least about 60 wt. %, or at least about 70 wt. %, or at least about 80 wt. %, or at least about 90 wt. %, or at least about 99 wt. %, up to 100 wt. % of all filler). As another non-limiting example, a mineral filler, such as a particulate mineral filler, can be used for the full amount of inorganic filler described for a substrate formulation herein, or other proportions (e.g., at least about 50 wt. %, or at least about 60 wt. %, or at least about 70 wt. %, or at least about 80 wt. %, or at least about 90 wt. %, or at least about 99 wt. %, up to 100 wt. % of all inorganic filler). In other examples, such as for some rubber-based substrate, an organic or non-mineral filler such as carbon black can be used for the full amount of filler described for a substrate formulation herein, or other proportions (e.g., at least about 50 wt. %, or at least about 60 wt. %, or at least about 70 wt. %, or at least about 80 wt. %, or at least about 90 wt. %, or at least about 99 wt. %, up to 100 wt. % of all filler).

In a first preferred embodiment, the present invention provides a covering panel according to the first aspect of the invention, wherein said filler material is present in an amount from 20 to 60 wt. % based on the total weight of said substrate.

In a second preferred embodiment, the present invention provides a covering panel according to the first aspect of the invention, wherein said filler material is present in an amount from 40 to 70 wt. % based on the total weight of said substrate.

In a third preferred embodiment, the present invention provides a covering panel according to the first aspect of the invention, wherein said filler material is present in an amount from 10 to 50 wt. % based on the total weight of said substrate.

In a preferred embodiment, said substrate comprises a filler material, said filler material being comprised predominantly of a mixture of chalk and talc. Thereby, it is meant that at least 50 wt. % and more preferably at least 80 wt. % of said filler material is comprised of chalk and talc. Most preferably, said filler material is comprised of at least 95 wt. % of chalk and talc.

In a preferred embodiment, the present invention provides a covering panel according to the first aspect of the invention, wherein said filler material is comprised of a mixture of chalk and talc in a ratio of 50:1 to 1:50, based on wt. %.

In a more preferred embodiment, said filler material comprises a mixture of chalk and talc in a ratio of 20:1 to 1:2, based on wt. %, more preferably in a ratio of 8:1 to 1:1, based on wt. %. Most preferably, said ratio is 8:1, 7:1, 6:1, 5:1, 4:1, 3:1 or 2:1, or any ratio there in between. Especially preferred is a chalk to talc ratio of 2:1. This is advantageous, because accordingly a substrate with high elasticity modulus is obtained. This allows to optimise the weight/stability ratio of the panel, e.g. by optimising the void volume of the panel, as is explained hereinafter. In one preferred embodiment, the substrate is rigid. The term "rigid" in the context of the present invention refers to a characteristic of a substrate or panel with an E-modulus of 1200 MPa or higher, measured according to ISO 527, a glass transition temperature ($T_g$) of 60° C. or higher, measured according to ISO 11357-2 and a Vicat temperature of 50° C. or higher, measured according to ISO 306-A-50. Preferably, said substrate has an E-modulus of 2000 MPa or higher and more preferable an E-modulus of 4000 MPa or higher. Using an optimised amount of talc and chalk, a substrate with an E-modulus up to 8000 MPa can reasonably be achieved. Preferably, said substrate has a glass transition temperature ($T_g$) of 75° C. or higher and more preferable a glass transition temperature ($T_g$) of 85° C. or higher. Preferably, said substrate has a Vicat temperature of 70° C. or higher and more preferable a Vicat temperature of 80° C. or higher.

In a preferred embodiment, the present invention provides a covering panel according to the first aspect of the invention, whereby said chalk is comprised of particles with at least 95% of said particles having a particle size less than 25.0 μm, measured according to ISO 13317-3. In a more preferred embodiment, the present invention provides a covering panel according to the first aspect of the invention, whereby said chalk is comprised of particles with at least 95% of said particles having a particle size less than 10.0 μm, measured according to ISO 13317-3.

The inventors have surprisingly found that said dimensions of particle size of said chalk, when incorporated in a polymeric matrix, even if merely in only one or several plastic layers, assist in improving the rigidity of substrate.

In a preferred embodiment, the present invention provides a covering panel according to the first aspect of the invention, whereby said talc is comprised of particles with at least 95% of said particles having a particle size less than 100.0 μm, measured according to ISO 13317-3. In a more preferred embodiment, the present invention provides a covering panel according to the first aspect of the invention, whereby said talc is comprised of particles with at least 95% of said particles having a particle size less than 25.0 μm, measured according to ISO 13317-3.

This is advantageous, because said dimensions of particle size of said talc, when incorporated in a polymeric matrix such as a plastic layer, assist in improving the rigidity of said substrate.

The substrate can be comprised, for example, of one or more substrate layers comprising a blend of polymer material and filler in sheet form. The synthetic material can form, for example, a continuous phase into which the filler is dispersed as a discrete phase. In another example, the substrate can comprise a laminate of diverse layers including one or more substrate layers (e.g., two or three or more substrate layers that can be the same or different with respect to composition and/or physical properties), each layer comprising a blend of synthetic material and filler.

In one embodiment, the substrate comprising a synthetic material and a minor amount of inorganic filler can have a print design or film applied over a substrate(s) or other intermediate layers with a clear (e.g., vinyl) wear layer(s) on top of the print film.

In various options, the substrate of the panel of the present invention can comprise one or more rubber or elastomer materials and at least one filler material. The rubber or elastomer can be present in the same amounts as those given for the thermoplastic polymer material, such as PVC, described herein. The rubber or elastomer can be the predominant component (by weight) in the substrate. As an option, the rubber or elastomer can be a substitute for the thermoplastic or PVC ingredient that can be used in the substrate. The rubber or elastomer component can be considered a polymer for purposes of the present invention. The rubber-based substrate of the present panels can be comprised of rubber (elastomer), fillers, and optionally pigment. The rubber can be, for example, a vulcanizable rubber, a reaction system elastomer, a thermoplastic elastomer, or other elastomers. Some filler, such as carbon black or others, also may function like a pigment to impart colour to the substrate. The amount of filler in the rubber-based substrate is specifically limited, and can range, for example, from about 15 wt. % to about 75 wt. %, or from about 30 wt. % to about 70 wt. %, or other amounts, based on the total weight of the substrate.

1.3 Top Layer

In one embodiment, said laminate structure is comprised of said substrate and a top layer. In one embodiment, a top layer comprises a print layer and a wear layer. The top layer is integrally attached to an upper surface of the substrate. The top layer also optionally can have an underlay below the printed design and a protective layer on top of the wear layer. The top layer(s) can be, for example, PVC, olefins, urethane, ionomer, acrylic, polyester, thermoplastic polyolefin (TPO), thermoset polyurethane (TPU), or other materials conventionally used for this type of layer(s) or materials. The protective layer can be, for example, a thermally cured system such as water based polyurethane dispersion system, water based acrylic, or vinyl emulsion coating, or a radiation cured coating system such as urethane epoxy or polyester acrylates, or other materials conventionally used for this type of layer or materials.

In one embodiment, the top layer further comprises natural fibres. Preferably, said natural fibres are derived from plant origin, such as described above. Carefully selected natural fibres can be selected from the list of natural fibres such as described above. For example, tree wood fibres allow to provide for a natural look, and when comprised in high amounts in said synthetic material. In a preferred embodiment, said natural fibres are comprised in an amount of 1 wt. % to 20 wt. %, based on the total weight of said top layer. More preferably, said natural fibres are comprised in an amount of 2 wt. % to 5 wt. %.

As indicated, some present panels can have a laminate construction, such as a laminate structure of a rigid substrate comprised of synthetic material and an amount of inorganic filler. In the laminate, the substrate contains a multilayer substrate, which in this embodiment can be referenced as a laminate substrate, and this substrate has a top surface, and located or affixed on the top surface of the substrate is a print layer. The print layer has a top surface and a bottom surface. Affixed onto the top surface of the print layer is a wear layer having a top surface and a bottom surface. An underlay layer optionally can be located and affixed between the bottom surface of the print layer and the top surface of the substrate. The present panels do not require a backing layer, but can optionally have a backing layer. Said backing layer can comprise a synthetic material and natural fibres, preferably in an amount of 1 wt. % to 20 wt. %, based on the total weight of said backing layer, and more preferably, in an amount of 2 wt. % to 5 wt. %.

1.4 Printed Design

In one embodiment, the print layer can be, for example, printed PVC film. The print layer can be, for example, a printed design, such as to simulate various wood grains. Generally, the print layer can be prepared by rotogravure printing techniques or other printing means such as digital printing.

In one embodiment, the substrate is produced by extrusion of at least one thermoplastic material comprising a filler material in an amount of 15 to 75 wt. % based on the total weight of said substrate, optionally comprising one or more colorants, wood-fibres, wood-particles, etc., after which a print pattern is directly applied on the substrate. The print pattern may be directly applied on the substrate using any technique known in the art. Preferably, the print pattern is applied to the substrate by laser printing, inkjet printing, intaglio printing, screen printing or any combination of the previous. Preferably, the print pattern is applied using a digital printing technique, such as inkjet printing or laser printing. The use of digital printing techniques improves the applicability of the process and allows a higher degree flexibility of the print patterns that can be applied on the substrate as compared to analogue printing techniques such as screen printing and intaglio printing. Other preferred embodiments comprising a print pattern directly applied onto the substrate are described in a co-pending European patent application No. EP15151552.5, entitled 'Covering and method for producing covering panels' filed by the Applicant on 16 Jan. 2015.

1.5 Wear Layer

The wear layer can be made of any suitable material known in the art for producing such wear layers, such as a polymeric film or overlay paper. The wear layer can be, for example, a transparent polyvinyl chloride layer. The dry film thickness of this PVC wear layer is preferably from about 0.10 mm to about 1.00 mm, and more preferably from about 0.25 mm to about 0.70 mm. Other examples of this wear layer include, but are not limited to, acrylic polymers, polyolefins, and the like. The wear layer can be a plasticized or a rigid polyvinyl chloride composition and/or other polymers, such as clear polymers. Optionally, the wear layer further comprises a topcoat which can be a thermoset layer or a thermoplastic layer. The wear layer top coat can be, for example, a water based, solvent based, radiation-curable, non-radiation curable, UV-curable or non-UV-curable system. For example, the wear layer top coat can be comprised of acrylics, acrylates, urethanes, epoxies, other types vinyl, other type polymers, and blends thereof, as long as the composition when cured, results in a rigid, thermoset coating with adequate cross-link density.

In the present invention, one or more layers can contain wear resistant particles, such as a wear layer and/or wear top coat layer (e.g., protective layer). One example is at least one layer containing aluminium oxide. The aluminium oxide used in the present invention is also known as alumina or $Al_2O_3$. The aluminium oxide can be fused or calcined. The refractive index can be from about 1.4 to about 1.7.

A sufficient amount of the aluminium oxide and/or other wear resistant particles can be present in at least one layer of the surface covering to provide improved wear and/or stain resistance to a surface covering as compared to no aluminium oxide being present. From about 2 gsm to about 50 gsm, or from about 4 gsm to about 20 gsm of alumina, for example, can be present in at least one layer of the surface covering. Alternatively, from about 1 wt. % to about 40 wt. % of alumina can be present in at least one layer of the surface covering. Also, while any source of aluminium oxide can be used, the aluminium oxide can have the following characteristics: fused or calcined and having a hardness of from about 6 to about 9 on a Mohs scale, and most preferably about 9 on a Mohs scale. The particle size of the aluminium oxide can be, for example, from about 10 microns to about to about 70 microns, or from about 20 microns to about 50 microns. Sources of aluminium oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala. The aluminium oxide, which can be part of at least one layer of the surface covering, can be added in any manner known to those skilled in the art for adding particles to a layer. The aluminium oxide can be mixed into a wet coating or scattered on top of a wet coating. The aluminium oxide can be, for example, applied by a pellet dispenser, which applies or sprinkles aluminium oxide on top of a layer which is still "wet" or uncured. By the layer being "wet" or uncured, the aluminium oxide "sticks" or adheres to the "wet" layer and at least a portion of the aluminium oxide "sinks" into the layer and thus is not exposed to the environment. Instead of alumina, other metal oxides or ceramics can be used.

1.6 Void Volume

In a preferred embodiment, the present invention provides a covering panel according to the first aspect of the invention, wherein said substrate has a void volume from 10 vol. % to 70 vol. %. The provision of a rigid covering panel with optimised filler content and a high void volume allows for a low weight of the covering panel without negatively impacting the mechanical durability of the panel. This is advantageous, because low weight of said panels is beneficial during transport and installation, while the excellent mechanical properties provide durability to the panels.

In one embodiment, the covering panel can comprise a substrate with a void volume from 10 vol. % to 70 vol. %, whereby said substrate comprises a foam of an open-cell structure. Open-cell means that the gas in that cell is not so restricted and is able to flow without passing through any polymer cell walls to the atmosphere. When filled with i.e. air or any similar gas, said substrate provides a relatively good insulator. In a preferred embodiment, said substrate is comprised with a void volume from 20 vol. % to 60 vol. %, more preferably from 35 vol. % to 50 vol. %.

In one embodiment, the covering panel can comprise a substrate with a void volume from 10 vol. % to 70 vol. %, whereby said substrate comprises a foam of a closed-cell structure. Closed-cell means that the gas within that cell is isolated from another cell by the polymer walls forming the cell. Accordingly, a substrate with comparatively higher compressive strength is obtained. Preferably, the closed-cells are filled with a specialized gas to provide improved insulation. Covering panels comprising one or more closed-cell structure foams exhibit higher dimensional stability, low moisture absorption coefficients, and higher strength. In a preferred embodiment, said substrate is comprised with a void volume from 30 vol. % to 70 vol. %, more preferably from 45 vol. % to 60 vol. %.

In one embodiment, the covering panel can comprise a multilayer substrate with a void volume from 10 vol. % to 70 vol. %, whereby said substrate comprises at least a first layer comprising a foam of a closed-cell structure. Each foam layer comprises a foam synthetic composition. A foam synthetic composition comprises a continuous polymeric matrix material and filler material with cells defined therein. Cellular (foam) has the meaning commonly understood in the art in which a polymer has a substantially void volume comprised of cells that are closed or open. Said multilayer substrate can further comprise 3, 4, 5, 6, 7, 8, 9 or 10 foamed layers, or a combination of foamed and non-foamed layers.

In one embodiment, the covering panel can comprise a substrate with a void volume from 10 vol. % to 70 vol. %, whereby said substrate comprises a foam with a mixed closed-cell structure and open-cell structure. The volume percentage of open and closed cells, is determined according to ISO 4590. A closed-cell foam has less than 30 percent, preferably 20 percent or less, more preferably 10 percent or less and still more preferably 5 percent or less and most preferably one percent or less open-cell content. A closed-cell foam can have zero percent open-cell content. Conversely, an open-cell foam has 30 percent or more, preferably 50 percent or more, still more preferably 70 percent or more, yet more preferably 90 percent or more open-cell content. An open-cell foam can have 95 percent or more and even 100 percent open-cell content.

Desirably, the foams of the foamed substrate comprise synthetic foam, which is a foam composition with a polymeric continuous matrix material and filler material. Any polymeric foam is suitable including extruded polymeric foam, expanded polymeric foam, free rise or restrained rise liquid dispensed polymeric foam, and moulded polymeric foam. The foams may comprise, and desirably comprises as a continuous phase, independently a thermoplastic polymer matrix material and/or a thermoset polymer matrix material. In other words, one foam layer may be a thermoplastic polymeric foam and the other foam layer may be a thermoset polymeric foam, both foam layers may be thermoset polymeric foams, or both foam layers may be thermoplastic polymeric foams. Desirably, both the first and second foam polymeric matrix material have a thermoplastic polymeric continuous phase comprising filler material.

1.7 Foaming Agent

The term "foaming agent" or "blowing agent", used herein as synonyms, refers to a compound capable of forming a cellular structure in a wide variety of materials, typically under the influence of heat, via a foaming process. Such cellular structure typically lowers the density of the material and typically results in an expansion in volume of the material. The blowing agent in the foamed plastic-based material may include at least one selected from a chemical blowing agent, a physical blowing agent, or a mixture thereof. Physical blowing agents are typically added to the material in a liquid phase, after which the temperature is raised, thereby transforming the blowing agent into its gaseous phase, and hence resulting in the formation of a cellular structure and the expansion of the material, though they may also be directly added to the material in their gaseous phase. Chemical blowing agents will undergo a chemical reaction under the influence of heat, thereby forming gaseous products that will form the cellular structure. As the chemical blowing agent, any compound may be used as long as the compound may be decomposed at a specific temperature to generate gas, and an example thereof may include azodicarbonamide, azodi-isobutyro-nitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, trihydrazino triazine, sodium bicarbonate, potassium bicarbonate, ammonium bicarbonate, sodium carbonate, ammonium carbonate, as well as any derivative of the previous or any combination of the previous. Further, examples of a physical blowing agent may include an inorganic blowing agent such as carbon dioxide, nitrogen, oxygen, argon, water, air, helium, or the like, or an organic blowing agent such as aliphatic hydrocarbons containing 1 to 9 carbon atoms, including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); fully and partially halogenated polymers and copolymers, desirably fluorinated polymers and copolymers, even more preferably chlorine-free fluorinated polymers and copolymers; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether and carboxylate compounds such as methyl formate, methyl acetate, ethyl acetate and carboxylic acid, or any combination of the previous.

The amount of blowing agent can be determined by one of ordinary skill in the art without undue experimentation for a given synthetic material to be foamed based on the type of synthetic material, the type of blowing agent, and the desired foam density. The foam density, typically, is selected depending on the particular application. Preferably, the foam density is equal to or less than about 1600 kg/m$^3$, more preferably less than about 1400 kg/m$^3$, even more preferably less than about 1300 kg/m$^3$, and most preferably less than about 1200 kg/m$^3$. A foam density of less than about 1150 kg/m$^3$ is especially preferred. Preferably the foam density is equal to or more than about 400 kg/m$^3$, more preferably more than about 600 kg/m$^3$, even more preferably more than about 800 kg/m$^3$, and most preferably more than about 1000 kg/m$^3$. A foam density of more than about 1050 kg/m$^3$ is especially preferred. A foam density of about 1100 kg/m$^3$ is especially preferred. Obviously, any density comprised between the aforementioned densities are deemed suitable with respect to the density of the substrate.

The cells of a foam layer may have an average size (largest dimension) of from about 0.05 mm to about 5.0 mm, especially from about 0.1 to about 3.0 mm, as measured by ASTM D-3576-98.

1.8 Plasticizer

In a preferred embodiment, the present invention provides a covering panel according to the first aspect of the invention, wherein said substrate comprises one or more plasticizers in an amount of less than 15 wt. %, based on the total weight of said substrate.

In a preferred embodiment, the present invention provides a covering panel according to the first aspect of the invention, wherein said substrate comprises one or more plasticizers in an amount of less than 10 wt. %, based on the total weight of said substrate. More preferably, said amount of one or more plasticizers in said substrate is comprised in an amount of less than 5 wt. %, based on the total weight of said substrate, and even more preferably, in an amount of less than 2 wt. %.

This is advantageous, because a reduced amount of one or more plasticizers provides a substrate with high elasticity modulus. Said high elasticity modulus corresponds to a high rigidity of the obtained panel and results in a reduced amount of curling of the finished covering panel.

The term "plasticizer" as referred herein is to be understood as a compound used to increase the fluidity or plasticity of a material, typically a polymer. The plasticizer can be any plasticizer known in the art. For example, the plasticizer may be a phthalic diester, such as diisononyl phthalate (DINP). Other examples of plasticizer include, but are not limited to ditridecylphthalate, diisodecyl phthalate, dipropylheptyl phthalate, diisooctyl terephthalate (DOTP), benzoates, adipates, any o-phthalate free plasticizers, natural-material based plasticizers, and the like.

In a preferred embodiment, the present invention provides a covering panel according to the first aspect of the invention, whereby said substrate is substantially free of one or more plasticizers.

By the term "substantially free of one or more plasticizers" is to be understood that no plasticizers are deliberately mixed with the synthetic material in order to form a substrate. Accordingly, said plasticizer is comprised in said substrate in an amount of less than 2 wt. %, based on the total weight of said substrate, more preferably in an amount of less than 0.5 wt. %, and even more preferably in an amount of less than 0.1 wt. %. Most preferably, no plasticizer is comprised in said substrate.

In a preferred embodiment, the present invention provides a covering panel according to the first aspect of the invention, whereby any of said top layer is substantially free of one or more plasticizers.

1.9 Polybenzoxazine

In one example, said synthetic material further comprises benzoxazine-based polymers. Polybenzoxazine is a class of high-performance materials possesses many intriguing characteristics. The ability of alloying with other minor components is one of the crucial properties for this novel kind of thermosetting, i.e., the properties of the rendered alloys and blends could be tailor-made to meet the requirements of any application because they possess good flame retardance, and thermal properties of phenolic resins, including their high mechanical properties, with good sound and noise absorbance. In addition, polybenzoxazines render near-zero volumetric shrinkage or expansion upon cure, high processability due to low melt viscosity before polymerization, low water uptake, high char yield, and low coefficient of thermal expansion. Moreover, the polymers render low dielectric constant and dissipation loss, high mechanical performance and great molecular design flexibility. Interestingly, the polymers possess a crucial property, i.e., the ability to be alloyed with many chemicals such as epoxy, polyurethane. This interesting property leads to the modification of mechanical and thermal properties of the rendered alloys. That means the drawback of the polybenzoxazine, i.e., its brittleness, could be managed by alloying with other polymers. Thermoplastic and/or thermosetting blends or copolymers one or more comprising benzoxazine-based polymers can be selected from the group comprising, but not limited to: benzoxazine/epoxy copolymers, benzoxazine/epoxy/phenolic resins, poly(benzoxazine-urethane) alloys, polybenzoxazine/poly-(N-vinyl-2-pyrrolidone) alloy, polybenzoxazine/poly($\varepsilon$-caprolactone) blends, poly-benzoxazine/poly(imide-siloxane) alloys, polybenzoxazine/polyimide blends, poly-benzoxazine/dianhydride copolymer, polybenzoxazine/lignin alloys. Other preferably benzoxazine-based synthetic materials are disclosed in 'Handbook of Benzoxazine', Ed. Hatsuo Ishida, Tarek Agag, Elsevier; and in 'Alloys and Composites of Polybenzoxazines', S. Rimdusit et al., Engineering Materials, DOI: 10.1007/978-981-4451-76-5_2, Springer Science+Business Media Singapore 2013.

In one preferred embodiment, said thermoplastic material comprises PVC, PVAc, PE, PS, PP, ABS, PET, PA, blends, and/or copolymers thereof. In one preferred embodiment, said thermosetting material is PU or a netting acrylate, or a phenol formaldehyde, or copolymers thereof, or mixtures thereof.

1.10 Reinforcement Layer

In one embodiment, the present invention provides a covering panel according to the first aspect of the invention, whereby said substrate further comprises a reinforcement layer.

1.10.1 Glass Fibre

In one embodiment, a covering panel is comprised of a substrate comprising an upper and a lower substrate. Between the upper substrate and the lower substrate there may be provided a reinforcement layer which is a glass fibre fabric that is impregnated with a rigid polyvinyl chloride (PVC) material. This reinforcement layer can have the function to further enhance the dimensional stability to the substrate, to prevent an excessive shrinkage or expansion of the covering panel due to a change of temperature. The reinforcement layer has a high thermal stability, i.e. it hardly changes its dimensions in case of a thermal variation, especially in the horizontal direction parallel to the upper and lower substrate. That is, the overall dimensional stability of the covering panel is high even when the substrate or other layers of the panel have the tendency to shrink or to expand due to a rise or fall of the temperature to which the panel is exposed. The present inventors have found that the provision of the reinforcement layer can further reduce a thermal shrinkage or expansion of the panel by up to 50%. Another important advantage of providing a reinforcement layer to the substrate is to improve the stability of the panel against local pressure by a sharp object, for example, a piece of furniture. This is due to the fact that the dense fabric of the glass fibre fabric that forms the reinforcement layer provides a strong resistance to a local pressure by a sharp or pointed heavy object resting on top of the panel. Even if the top layers resting on the reinforcement layer, especially at least one of the upper substrate and a print layer, are compressed punctually to some extent, this local compression will not cause a deterioration or even a lasting damage of the overall structure of the panel because of the resistance of the reinforcement layer.

In one example of the reinforcement layer, a nonwoven glass fibre fabric can be used with a surface weight of 65 gsm. Preferably, the glass fibres have an average length of at least 3.0 mm, and preferably an average length of at least 4.5 mm.

Preferably, said length is at most 20.0 mm, more preferably at most 12.0 mm and even more preferably at most 9.0 mm. The glass fibre fabric be impregnated with a plastic material such as a PVC material. Fillers can also be contained in the PVC material for impregnating the glass fibre fabric.

Accordingly, the thermal dimensional stability and the mechanical stability against local pressure are significantly enhanced. In a more preferred example, the glass fibre may be impregnated with a plastic material such as a PVC material containing no plasticizer. Fillers can also be contained in the plastic material for impregnating the glass fibre fabric. In one embodiment for the structure of a covering panel, an upper substrate consists of virgin polyvinyl chloride (PVC), while the lower substrate consists of recycled PVC material.

In a one embodiment, the invention provides a panel according to the first aspect of the invention, wherein said glass fibres are comprised in a glass fibre fleece and/or in a glass fibre fabric. Preferably, said glass fibres are comprised in a glass fibre fleece, such as, for example, a nonwoven. Such nonwoven glass fibres, in fact, appear to have a better embedding in the thermoplastic matrix, as a result of which a stronger and more rigid layer is obtained.

In one embodiment, the invention provides a panel according to the first aspect of the invention, wherein said glass fibre are pre-treated with an adhesion additive, which is intended to improve the adhesion between said glass fibres and said thermoplastic matrix. For example, said glass fibres are pre-impregnated with the aid of thermoplastic material, such as, for example, extruded granulate.

In one embodiment, the invention provides a panel according to the first aspect of the invention, wherein at least said substrate and/or at least said top layer additionally comprises individual reinforcement fibres, wherein said individual reinforcement fibres are not laterally interconnected in a network, but are dispersed in a synthetic matrix. Preferably, said reinforcement fibres have a length of at least 0.3 mm, and more preferably at least 1.0 mm. Such reinforcement fibres and/or reinforcement layers are intended to further contribute to the dimensional stability and/or rigidity of said panels according to the invention, which is one of the objectives to be achieved by the present invention.

Preferably, said reinforcement fibres are distributed in said one or more thermoplastic layers, whether or not in the form of a glass fibre cloth and/or a glass fibre fleece.

Preferably, said reinforcement fibres are comprised in said thermoplastic layers in a quantity of between 1 and 25 wt. %, and more preferably between 5 and 15 wt. %, relatively with respect to the total weight of said reinforcement fibres and thermoplastic layers. Still preferably, said fibres meet the description according to the DIN 1259 standard. In a first embodiment, said reinforcement fibres comprise glass fibres, however, in an alternative embodiment, also steel fibres, carbon fibres, aramid fibres, polyethylene fibres and/or polypropylene fibres may be used. In yet an alternative embodiment, fibres from biological origin are used, such as natural fibres as described above. Said reinforcement fibres preferably have an average diameter situated between 1 µm and 100 µm, though more preferably between 3 µm and 30 µm. Most preferably, said average diameter is between 5 µm and 25 µm. In a further preferred embodiment, said reinforcement fibres are pre-treated with an additive or coating to enhance the adhesion between said reinforcement fibres and said thermoplastic layers, for example, but not limited to silane. In a further preferred embodiment, reinforcement fibres are selected with a thermal expansion coefficient lower than the thermal expansion coefficient of said thermoplastic layers in which said fibres are contained and/or with an elastic modulus which is preferably greater than the modulus of said thermoplastic layers, and preferably greater than 40 GPa, and more preferably greater than 60 GPa. In an additional preferred embodiment, said invention provides a panel with reinforcement fibres which have a low thermal expansion coefficient, such as a thermal expansion coefficient of less than 30 µm/m·K and more preferably less than 5 µm/m·K.

In one embodiment, the present invention provides a panel according to the first aspect of the invention, wherein said glass fibres have a length of 1 mm or more, and preferably a length of 3 mm or more. In a preferred embodiment, the present invention provides a panel according to the first aspect of the invention, wherein said glass fibres have a diameter situated between 5 and 25 µm.

In one embodiment, the invention provides a method according to the second aspect of the invention, comprising at least the step of forming a first substrate, wherein preferably said substrate is extruded and subsequently, immediately, thus in the melt state, arranged on a fibrous material, for example, a glass fibre cloth or a glass fibre fleece. Even more preferably, said substrate in the melt state is at least partially pressed through said fibre material. Thus, a reinforcement layer attached to a substrate is achieved. Preferably, said the thus formed substrate comprises a quantity of between 0.25 and 25 wt. % of fibre material, and more preferably between 0.5 and 15 wt. %, relative to the total weight of said substrate with reinforcement fibres.

In one embodiment, a panel according to the first aspect of the invention is provided with a glass fibre fabric in the top layer, whereby the top layer is provided on the top surface of a substrate. In addition a second substrate layer is provided on the bottom surface of said substrate, whereby said second substrate comprises a glass fibre fabric in a synthetic material.

1.10.2 Alternative Reinforcement Layers
1.10.2.1 Synthetic Fibres

In an alternative embodiment, steel fibres, carbon fibres, aramid fibres, polyethylene fibres and/or polypropylene fibres are used for providing reinforcement fibres.

In an embodiment of the present invention, the reinforcement material is a nonwoven spun-bond material. A spun-bond nonwoven material is preferred above other nonwoven materials, such as, for example, needle-punched nonwoven material, since a spun-bond nonwoven material possesses high material strength. Preferably, the nonwoven material is comprised of two synthetic materials, whereby the two synthetic materials have a different melting point. The different polymers, where the nonwoven material is made from, exist either in separate filaments or together in one filament. It would therefore be possible that the nonwoven material comprises two filament types. The two filament types are predominantly made from different polymers with different melting points, so-called bifil types. The term "predominantly" as used herein means at least 90%. It is preferred that the melting points of the two different polymers differ by at least 10° C. More preferably the melting points differ by at least 50° C. Such a product could also be thermally bonded by subjecting the nonwoven product to a temperature in the range of the melting point of the polymer with the lower melting point. However, this nonwoven product would not be bonded at each crossing point since fibres comprising the polymer with the higher melting point might cross each other. Only crossing points of fibres in a combination high and low melting point or low and low melting point would be bonded and not the crossing points of fibres with high melting point. A nonwoven carrier made from bicomponent filaments is therefore preferred. The bicomponent filaments of the nonwoven carrier are thermally bonded. Bicomponent filaments are filaments of two polymers of different chemical construction. A basic distinction is being drawn between three types: side by side types, sheath core types and matrix/fibril types.

The nonwoven material comprises preferably a sheath-core type bicomponent nonwoven material. Preferably, the nonwoven material comprises sheath core type bicomponent filaments. Such a sheath-core type bicomponent nonwoven material possesses a core which acts as a backbone with the sheath being the bonding medium of the backbone. The structure of such a product becomes very stable because the filaments are bonded at each crossing point of the filaments thus creating a nonwoven with the highest quantity of bonding points. The dimensional stability of the nonwoven carrier can be made regular over the length and width by optimising the filament distribution. This structure gives enough resistance to the high local impregnation pressure needed for obtaining a smooth impregnated surface over the full width. The great number of bonding points provides a stable nonwoven material already at low area unit weights while leaving enough open space for penetration of the thermoplastic material through the nonwoven textile layer, which ensures good mechanical bonding. The sheath-core type bicomponent nonwoven material possesses a uniform stability. The properties of the described sheath-core type bicomponent nonwoven material make possible a stable processing at low weight and thickness. Preferably, the sheath-core type bicomponent nonwoven material comprises a core consisting mainly of polyester and a sheath consisting mainly of polyamide. Alternatively, the sheath consists mainly of polyamide 6 and the core consists mainly of polyethylene terephthalate. Preferably the sheath/core ratio lies between 95/5 volume percent and 5/95 volume percent. More preferably the sheath/core ratio lies between 50/50 volume percent and 5/95 volume percent. The nonwoven material preferably has a basis weight of 50 gsm to 2500 gsm. More preferably, the nonwoven material has a basis weight of 75 gsm to 1000 gsm. Even more preferably, the nonwoven material has a basis weight of 100 gsm to 350 gsm. Most preferably, the nonwoven material has a basis weight of 150 to 280 gsm. A basis weight of the nonwoven material between these limits ensures that the nonwoven material is open enough for penetration of the thermoplastic material, ensuring good mechanical bonding.

1.10.2.2 Natural Fibres

In yet a preferred alternative embodiment, natural fibres from plant origin are used, such as, for example, but not limited to, flax fibre, bamboo fibre, wood fibre, rice fibre.

In one embodiment, the substrate can be any type of substrate suitable to provide a covering with a laminated structure comprising at least one substrate onto which a top layer can be applied. In one embodiment, the substrate comprises a polymer-based material, a foamed polymer-based material or any combination thereof and preferably natural fibres, as described above.

In one embodiment, the wear layer of a covering panel according to the first aspect of the invention comprises one or more fibres, preferably natural fibres.

1.11 Impact Modifier

In a preferred embodiment, the present invention provides a covering panel according to the first aspect of the invention, whereby said substrate further comprises at least one impact modifier, preferably in an amount from 0.1 to 15 wt. % based on the total weight of said substrate.

Impact modifiers are key additives for increasing flexibility and impact strength to meet physical property requirements of rigid parts. Impact modifiers are elastomeric or rubbery in nature, with a lower modulus than the host polymer. The dispersed rubber phase acts to absorb or dissipate the energy of impact in order to stop craze or crack propagation. In order to stop craze propagation and achieve good impact modification, the rubbery phase must be very well dispersed and the impact modifier must be compatible with the host polymer. Good adhesion is necessary to prevent the cracks from propagating around the elastomeric particle. The rubber particle should also have enough cohesive strength to prevent the crack from propagating easily through the rubber particle. To maintain impact at low temperatures, the glass transition temperature ($T_g$) of the impact modifier should be very low.

Selected impact modifiers are provided by, but not limited to, Crompton (Blendex), Atofina (Clearstrength), Kaneka (Kane Ace), Atofina (FinaClear), KRATON Polymers (Kraton D), KRATON Polymers (Kraton G), KRATON Polymers (Kraton FG), Atofina (Durastrength), DuPont (Elvaloy and Elvaloy HP), Rohm and Haas (Paraloid, Advastab, Advalube), Kaneka, Optatech (PACREL), DuPont-Dow (Tyrin), Crompton (Royalene), DuPont-Dow (Nordel), ExxonMobil (Vistalon), Crompton (Royaltuf), DuPont (Fusabond), Crompton (Royaltuf), DuPont (Elvaloy PTW), DuPont (Surlyn), Dow (AFFINITY Polyolefin Plastomers, VERSIFY), DuPont-Dow Elastomers (Engage), ExxonMobil (Vistamaxx), Atofina (Lotryl), DuPont (Elvaloy AC), Crompton (Interloy), Atofina (Lotader), DuPont (Fusabond, Elvaloy PTW), Baerlocher (Degalan), Arkema (Durastrength), Akcros.

In a preferred embodiment, the present invention provides a covering panel according to the first aspect of the invention, whereby said substrate further comprises stabilizers, processing aids, lubricants, colorants and/or adhesion promoters.

1.12 Stabilizer

The substrate also can include at least one heat stabilizer. A stabilizer typically provides heat stability and/or UV light stability to a formulation based on a synthetic material. As a non-limiting example, when PVC is used as polymer, the stabilizer may be a calcium-zinc stabilizer. A calcium-zinc stabilizer containing about 5.5 wt. % or more zinc may be used, such as about 6.0 wt. % to about 10.0 wt. % zinc. Specific non-limiting examples of zinc-calcium stabilizers are supplied by Baerlocher. Other examples of stabilizers include, but are not limited to, barium-cadmium stabilizers, barium-zinc stabilizers, organotin stabilizers, epoxidized soybean oils, and the like.

Other ingredients can be present in the substrate, such as flame retardants, UV stabilizers, antistatic agents, wear resistant particles, antimicrobial additives, pigments, processing aids, dispersion additives, lubricants, colorants, modifying resins, cross-linking agents, antioxidants, foaming agents, tackifiers, and/or other conventional organic or inorganic additives commonly used in polymers (e.g., vinyl) used in surface coverings.

1.13 Coupling Agent

As an option, one or more coupling agents can be present in any of the formulations, such as a maleic anhydride. Generally, the coupling agent can be present in an amount sufficient to permit sufficient coupling of the homopolymer and/or other components. Amounts can be, for instance, from about 5 wt. % or less (e.g., about 0.1 wt. % to 4 wt. %). Other amounts can be used.

1.14 Adhesives

Suitable materials for use as adhesion promotors or adhesives or in an adhesive layer may be the same or different between different layers. Any adhesive capable of bonding a specific layer to another layer is within the scope of the present invention. An effective type and amount of adhesive can be determined by one of ordinary skill in the art without undue experimentation for a given (foam) layer/(foam) layer combination.

Not to be limited to the following adhesives, a suitable adhesive may be a compound such as a chemical adhesive which, for example can be a one-part or multiple part adhesive such as a two-component polyurethane liquid adhesive, for example a polyurethane or an epoxy; a film such as double sided tape or pressure sensitive adhesive (PSA); or another layer or film comprising a material which is compatible with (i.e., bonds to) both a first and a second layer.

Suitable materials for use as adhesives or in adhesive layers include those adhesive materials known in the art as useful with plastic surfaces and foams, see U.S. Pat. No. 5,695,870. Examples include polyolefin copolymers such as ethylene/vinyl acetate, ethylene/acrylic acid, ethylene/n-butyl acrylate, ethylene ionomers, ethylene/methylacrylate, and ethylene or propylene graft anhydrides. Other useful adhesives include urethanes, copolyesters and copolyamides, styrene block copolymers such as styrene/butadiene and styrene/isoprene polymers, acrylic polymers, and the like. The adhesives may be thermoplastic or curable thermoset polymers, and can include tacky, pressure-sensitive adhesives. The adhesive or adhesive layer is preferably recyclable within the panel manufacturing process. The adhesive material must not negatively impact the physical integrity or properties of the panel to a substantial degree.

In one embodiment, mechanical means may be used to bond two or more layers of the present invention. For example, fasteners, snap fits, clips, mounting points, joints, channels, Velcro, and the like may be used. In this embodiment, there can additionally be provided an adhesive layer between the first and second layers, or any layers which are bonded by this means.

In one embodiment, thermal means may be used to bond or weld together two or more layers of the present invention.

In one embodiment, sonic vibration may be used to bond or weld together two or more layers in accordance with the present invention.

In one embodiment, physical means may be used to bond or weld together two or more layers of the present invention. In one embodiment, chemical means may be used to bond or weld together two or more layers of the present invention. In this context, chemical means relates to chemically curing adhesives which are reactive materials and require chemical reaction to convert them from their liquid or thermoplastic state to solid state upon curing.

In one embodiment, one or more of thermal means, mechanical means, physical means, chemical means, and/or adhesive means, may be used in combination to bond two or more layers to each other. To promote adhesion or bonding between said two or more layers, one or both of the surfaces to be bonded may optionally be planed, grooved, scored, roughened, sanded, subjected to a surface modification such as, but not limited to, i.e. a plasma treatment, a corona treatment, etc. to promote chemical and/or mechanical adhesion.

1.15 Various Additives

The substrate(s) formulation comprises synthetic material, fillers, and optionally pigments and/or variegated pigments compounded with suitable lubricants and processing aids. Other common additives include any one or combination of more than one of the following: infrared attenuating agents (for example, carbon black, graphite, metal flake, titanium dioxide); nucleating agents (for example, magnesium silicate); flame retardants (for example, brominated flame retardants such as brominated polymers, hexabromocyclododecane, phosphorous flame retardants such as triphenylphosphate, and flame retardant packages that may including synergists such as, for example, dicumyl and polycumyl); internal lubricants (for example, calcium stearate and barium stearate, fatty alcohols, low esterification esters, EVA waxes, etc.) for reducing melt viscosity and enhancing transparency; external lubricants (for example polyethylene waxes, oxidized polyethylene waxes, paraffins, metal soaps, high esterification esters, amides, fatty acids, etc.) for reducing friction between the polymer melt and the extrusion mould; acid scavengers (for example, magnesium oxide and tetrasodium pyrophosphate); UV light stabilizers; thermal stabilizers; and colorants such as dyes and/or pigments.

In a preferred embodiment, the present invention provides a covering panel according to the first aspect of the invention, whereby any herein described embodiments are combined to further improve the dimensional stability of said covering panel.

2. Process of Producing Covering Panels

In a second aspect, the present invention provides a process of producing covering panels, such as floor panels, wall panels or ceiling panels, each covering panel comprising at least one substrate and optionally a top layer, whereby said at least one substrate comprises a synthetic material and a filler material; the method comprising the steps of:

mixing said synthetic material and said filler material, thereby obtaining a mixture;

extrusion of said mixture, preferably through a sheet-profile extrusion head, thereby obtaining a substrate;

optionally, laminating said substrate to a top layer;

thereby obtaining a covering panel, whereby said filler material is mixed with said synthetic material in an amount from 15 to 75 wt. % based on the total weight of said mixture.

The present panels can be formed using a variety of methods. For instance, the floor panel can be formed by individually pre-forming the substrate(s) and/or any print layer that contains the print design. The wear layer can be present as an overlay wear layer or can be formed afterwards. The wear layer can include a protective layer, strengthening layer, and the like. The substrate(s) can be individually formed by calendar rolling, extrusion or other techniques once the formulation for the substrate(s) are prepared. Then, the layers that constitute the entire sheet or a part thereof can be placed on top of each other in a stack in their correct order and subjected to hot pressing using a hydraulic press to form a panel body that can be milled to form the tongue and groove edge profiles.

In a preferred embodiment, said synthetic material and said filler material are mixed, whereby said filler material is mixed with said synthetic material in an amount from 15 to 75 wt. % based on the total weight of said mixture. Subsequently, the mixture is extruded, preferably through a sheet-profile extrusion head, thereby obtaining a substrate. Said substrate is immediately, that is without cooling of the obtained substrate to a temperature below 120° C., affixed to a top layer using lamination techniques, using the remaining extrusion heat in the substrate as the necessary thermal energy to provide for good adhesion between said substrate and said top layer.

In one example, the panel is manufactured as multiple individual pressed layers, which are consolidated into a unitary panel. In one example, a panel layup including one or more substrate layers, a print layer, and optionally a wear layer, are stacked in their correct order and subjected to hot pressing using a hydraulic press to form a panel. For instance, the temperature can range, for example, from about 125° C. to about 135° C. or other temperatures above or below this range. The pressure can be, for example, from about 4 MPa to about 18 MPa or other pressures above or below this range. Generally, the time that the pressure can be applied, for example, is from about 30 seconds to about 20 minutes, such as from about 1 minute or any time above or below these ranges. The consolidation to form the panel can be a large panel that can be punched or cut up into desired final dimensions of the panel (or multiple panels). Once the hot pressing to form the consolidated panel is achieved, the panel can optionally be provided with a top coat layer or protective layer, like a UV protective layer, optionally containing wear resistant particles, such as aluminium oxide or other wear resistant particles, which can be applied by of a spray coating, roller coating, or by application with an air knife coater, curtain coater or the like.

Subsequently, the thus obtained panel can be then annealed to remove stress and achieve dimensional stability. The annealing can occur in an oven or other heating device. The annealing can occur at a temperature above the glass transition temperature, as determined by ISO 11357-2 and preferably at a temperature above the Vicat softening temperature, as determined by ISO 306-A-50 and most preferably at a temperature of from about 125° C. to about 135° C. This annealing can be done on a conveyor belt, through an infrared oven or conventional air impinged oven, the speed can be any suitable speed depending upon the length of the oven and the temperature setting. For instance, the speed of the conveyor belt can be about 3 meters per minute to about 10 meters per minute, such as about 3.5 meters per minute to about 8 meters per minute. Afterwards, the panel can be aged at ambient conditions, such as about 25° C., for various hours, such as about 1 day (about 24 hrs.), about 2 days (about 48 hrs.), about 3 days (about 72 hrs.), or more. Afterwards, the panel can be cut or punched out to panel sizes. Then, the sides of the resulting panels can be profiled by cutting (e.g., milling) to impart the desired locking means, such as i.e. click profiles.

A panel according to the first aspect of the invention can also be obtained, for example, by printing a design directly on the top surface of the substrate using any number of printing techniques such as gravure printing, transfer printing, digital printing, flexo printing, and the like. Or, a printed thermoplastic film (e.g., PVC) or a wood veneer and the like can be laminated to the substrate.

A protective coating can then be provided on top of the printed design. Any type of protective coating or wear layer can be used, such as a polyurethane type coating with or without wear resistant particles in the coating. The protective coating can be applied by conventional techniques, such as with a curtain coater, direct roll coater, vacuum coater, differential roll coater, air knife coater, or spray apparatus.

The top surface of the panel can further have a textured or embossed surface. Said structure can be imprinted onto the surface of the transparent finishing layer to imitate i.e. a wood structure. This imprinting process can be performed by rolling under heat and pressure to deform the surface of the transparent protective coating.

Additionally, a further protective coating can then be placed on top of the textured surface. Any type of protective coating can be used, such as a polyurethane type coating with or without wear resistant particles in the coating. The protective coating can be applied by conventional techniques, such as with a curtain coater, direct roll coater, vacuum coater, differential roll coater, air knife coater, or spray apparatus.

In a preferred embodiment, the present invention provides a process according to the second aspect of the invention, whereby the surface of the extruded substrate is not subjected to a surface modification step prior to further processing. Thereby, the term "surface modification" refers to process of planing, grooving, scoring, roughening, sanding, corona- or plasma-treatment and the like to modify surface characteristics. This is advantageous, because abrasion of the surface layer of a foamed open- or closed-cell substrate yields damage to the cell structure and eventually results in loss of mechanical properties of the substrate.

In a preferred embodiment, the present invention provides a process according to the second aspect of the invention, whereby said substrate is attached to said top layer at a temperature higher than the softening point but lower than the melt temperature of the principal polymer comprised in said substrate.

The softening point is the temperature at which a material softens beyond some arbitrary softness. It can be determined, for example, by the Vicat method (ASTM-D1525 or ISO 306). The term "principal polymer" refers to a polymer in said substrate composition, whereby said principal polymer constitutes the major or predominant part of all polymer material in said substrate composition.

By using a process whereby said substrate is attached to said top layer at a temperature higher than the softening point but lower than the melt temperature of the principal polymer comprised in said substrate, the heat in said substrate contributes to good adhesion properties between said substrate and said top layer.

In a preferred embodiment, the present invention provides a process according to the second aspect of the invention, whereby at least the surface of said substrate is reheated before attaching said substrate to said top layer.

By using a reheating step, using i.e. IR heating, the part of said substrate at the upper surface which is to be connected to said top layer is locally reheated in order to improve adhesion between said layer, without the need for reheating the entire substrate. This results in an energetic advantage for the lamination process.

In a preferred embodiment, the present invention provides a process according to the second aspect of the invention, whereby said substrate and said top layer are subsequently subjected to a double stack lamination process.

By using a double stack lamination process, both the substrate and the top layer are guided between a top and bottom roll system thereby connecting and affixing both layers to each other and providing a laminated panel.

EXAMPLES

By means of further guidance, examples are included to better appreciate and further clarify the teaching of the present invention. Said examples are intended to assist the description of the invention and are nowhere intended as a limitation of the presently disclosed invention.

Examples 1 to 16

A granulate is formed by compounding of a synthetic material (PVC or a mixture of PVC and a PVC/PVAc copolymer comprising a 11% PVAc content, in a 60:40 weight ratio). Together with this synthetic material is compounded a filler mixture comprising a filler, a stabilizer, a processing aid, an impact modifier and a lubricant, in ratio's as depicted in Table 1. No plasticizer is compounded into the granulate in order to provide a rigid PVC compound.

In Examples 1 to 4, the selected filler is entirely comprised of chalk. In Examples 5 to 8, the selected filler is comprised of chalk and talc in a weight ratio of 76.5:8.5. In Examples 9 to 12, the selected filler is comprised of chalk and talc in a weight ratio of 68.0:17.0. In Examples 13 to 16, the selected filler is comprised of chalk and talc in a weight ratio of 59.5:25.5. In Examples 17 to 22, other fillers are tested.

TABLE 1

Mixtures of a synthetic material, a filler material and additives for extrusion of a substrate for producing a covering panel according to the invention.

| Ex. | PVC [1] | PVC/PVAc [2] | chalk [3] | stabilizer [4] | processing aid [5] | impact modifier [6] | talc [7] | lubricant [8] | |
|---|---|---|---|---|---|---|---|---|---|
| 1 | 60 | 40 | 85.0 | 4 | 0.50 | 4 | | 2 | |
| 2 | 60 | 40 | 85.0 | 4 | 0.50 | 8 | | 2 | |
| 3 | 100 | | 85.0 | 4 | 0.50 | 4 | | 2 | |
| 4 | 100 | | 85.0 | 4 | 0.50 | 8 | | 2 | |
| 5 | 60 | 40 | 76.5 | 4 | 0.50 | 4 | 8.5 | 2 | |
| 6 | 60 | 40 | 76.5 | 4 | 0.50 | 8 | 8.5 | 2 | |
| 7 | 100 | | 76.5 | 4 | 0.50 | 4 | 8.5 | 2 | |
| 8 | 100 | | 76.5 | 4 | 0.50 | 8 | 8.5 | 2 | |
| 9 | 60 | 40 | 68.0 | 4 | 0.50 | 4 | 17 | 2 | |
| 10 | 60 | 40 | 68.0 | 4 | 0.50 | 8 | 17 | 2 | |
| 11 | 100 | | 68.0 | 4 | 0.50 | 4 | 17 | 2 | |
| 12 | 100 | | 68.0 | 4 | 0.50 | 8 | 17 | 2 | |
| 13 | 60 | 40 | 59.5 | 4 | 0.50 | 4 | 25.5 | 2 | |
| 14 | 60 | 40 | 59.5 | 4 | 0.50 | 8 | 25.5 | 2 | |
| 15 | 100 | | 59.5 | 4 | 0.50 | 4 | 25.5 | 2 | |
| 16 | 100 | | 59.5 | 4 | 0.50 | 8 | 25.5 | 2 | |
| 17 | 100 | | | 4 | 0.5 | | 75 | 2 | |
| 18 | 100 | | | 4 | 0.5 | | | 2 | 75 [9] |
| 19 | 100 | | | 4 | 0.5 | | | 2 | 75 [10] |
| 20 | 100 | | | 4 | 0.5 | | | 2 | 75 [11] |
| 21 | 100 | | | 4 | 0.5 | | | 2 | 75 [12] |
| 22 | 100 | | | 4 | 0.5 | | | 2 | 75 [13] |

*parts per hundred of synthetic material, comprising PVC and PVC/PVAc copolymer.
[1] S3160, Vinnolit;
[2] S3157/11, Vinnolit;
[3] Craie Moulue, Omya;
[4] Baeropan MC 90060P, Baerlocher;
[5] Paraloid K-125 ER, Dow;
[6] Paraloid KM-376, Dow;
[7] Luzenac 1445, Imerys;
[8] Baerolub L-PL, Baerlocher;
[9] Glass fibre: OC968, Owens Corning;
[10] Mica: MKT, Imerys;
[11] Wollastonite: Nyglos 12, Imerys;
[12] Wollastonite: Aspect 3992, Imerys;
[13] Chalk: VS10, Omya.

The obtained granulate is subsequently moulded to substrate test samples for determination of physical properties as depicted in Table 2. In Examples 1 to 116, the results show that a distinctive decrease of total shrink properties is observed with the increase of chalk:talc ratio from 1:0 to 59.5:25.5. All tests show that the reduction in total shrink is mainly due to the reduction of the relaxation shrink, which is sought to be minimized by the invention as it largely affects the occurrence of curling of the accordingly obtained covering panels. The decreased shrinking properties occur concurrent with enhanced stiffness as expressed by the E modulus. The results also show that total shrink is lower for samples comprising 100 wt. % of PVC compared to samples comprising 40 wt. % of a PVC/PVAc copolymer, although the copolymer exhibits comparatively higher stiffness. Furthermore, in Examples 17 to 22, the results show that the addition of other types of filler also leads to a distinct improvement of shrink properties. Addition of higher amounts of impact modifier show to negatively impact both the total shrink and E modulus, leading to conclude that lower amounts of impact modifier are preferred.

TABLE 2

Physical properties of a covering panel according to the invention.

| Ex. | relaxation shrink [%][a] | melt shrink [%][b] | total shrink [%][c] | E modulus [MPa][d] |
|---|---|---|---|---|
| 1 | −1.76 | −0.31 | −2.07 | 3930 |
| 2 | −1.81 | −0.31 | −2.12 | 3690 |
| 3 | −1.22 | −0.33 | −1.55 | 3720 |
| 4 | −1.31 | −0.35 | −1.65 | 3520 |
| 5 | −1.40 | −0.28 | −1.67 | 4200 |
| 6 | −1.53 | −0.29 | −1.82 | 4000 |
| 7 | −1.05 | −0.31 | −1.35 | 3980 |
| 8 | −1.00 | −0.32 | −1.31 | 3970 |
| 9 | −1.19 | −0.25 | −1.44 | 4470 |
| 10 | −1.33 | −0.26 | −1.59 | 4360 |
| 11 | −0.75 | −0.27 | −1.01 | 4430 |
| 12 | −0.85 | −0.29 | −1.13 | 4480 |
| 13 | −1.01 | −0.23 | −1.24 | 4770 |
| 14 | −1.08 | −0.24 | −1.32 | 4630 |
| 15 | −0.72 | −0.26 | −0.98 | 4770 |
| 16 | −0.73 | −0.26 | −0.99 | 4520 |
| 17 | −0.49 | −0.20 | −0.69 | 12300 |

TABLE 2-continued

Physical properties of a covering panel according to the invention.

| Ex. | relaxation shrink [%]$^a$ | melt shrink [%]$^b$ | total shrink [%]$^c$ | E modulus [MPa]$^d$ |
|---|---|---|---|---|
| 18 | −0.16 | −0.14 | −0.29 | 11900 |
| 19 | −0.62 | −0.29 | −0.91 | 10500 |
| 20 | −0.39 | −0.16 | −0.56 | 15800 |
| 21 | −0.52 | −0.23 | −0.75 | 16100 |
| 22 | −1.63 | −0.43 | −2.06 | 4800 |

$^a$For determining shrink properties, the length of five extruded test samples was determined five times for each composition to determine an average length value. Subsequently, the samples were subjected to 80° C. for 15 hours and subsequently stored at room temperature (25° C.) for 24 hours. By determining the length of each sample, the relaxation shrink can be determined.
$^b$Melt shrink is determined from the difference between mould dimensions and the dimensions of the moulded test samples upon cooling to room temperature.
$^c$Total shrink can be determined from melt shrink and relaxation shrink.
$^d$E modulus is determined according to ISO 527.

Using the compound of example 15, a substrate of 2 mm thickness is extruded using a sheet-type extrusion head. The substrate is subsequently guided over a roll element, where it is attached to a cushion vinyl layer comprising a wear layer of 0.5 mm. In order to improve the lamination process, the surface of the extruded sheet is re-heated using an IR-heater or a hot air blower to a surface temperature of about 100° C. before contacting with the cushion vinyl layer.

Finally, a backing layer is attached to the surface of the substrate which is not connected to the wear layer and pressed together by a double stack set-up in order to ensure a rectilinear guidance of the compressed laminate panel. The inventors have found that such a rectilinear guidance reduces curling behaviour of the final covering panel product, as determined according to EN 434.

For practical use in surface covering applications, the covering panel can be dimensioned to suit the appropriate dimensions for transport and installation of the covering panels according to standard industrial methods.

The invention claimed is:

1. Covering panel, including a floor panel, wall panel or ceiling panel, said covering panel comprising at least one substrate and a top layer, whereby said substrate comprises a polyvinyl chloride and a filler material, wherein at least 95 wt. % of said filler material comprises a mixture of chalk and talc, wherein said substrate comprises said filler material in an amount from 30 to 50 wt. % based on the total weight of said substrate, wherein said substrate further comprises a void volume from 30 to 70 vol. % determined according to ISO 4590 and wherein the top layer is integrally attached to an upper surface of the substrate, wherein the mixture of chalk and talc has a chalk to talc ratio of 8:1 to 1:1.

2. Covering panel according to claim 1, whereby said chalk is comprised of particles with at least 95% of said particles having a particle size less than 25.0 μm, measured according to ISO 13317-3.

3. Covering panel according to claim 1, whereby said talc is comprised of particles with at least 95% of said particles having a particle size less than 100.0 μm, measured according to ISO 13317-3.

4. Covering panel according to claim 1, wherein said substrate comprises one or more plasticizers in an amount of less than 10 wt. %, based on the total weight of said substrate.

5. Covering panel according to claim 1, whereby any of said top layer and/or said substrate is substantially free of one or more plasticizers.

6. Covering panel according to claim 1, whereby said substrate further comprises at least one impact modifier, preferably in an amount from 0.1 to 15 wt. % based on the total weight of said substrate.

7. Covering panel according to claim 6, whereby said substrate further comprises stabilizers, processing aids, lubricants, colorants, foaming agents and/or adhesion promoters.

8. Process of producing covering panels including floor panels, wall panels or ceiling panels, each covering panel comprising a top layer and at least one substrate, whereby said at least one substrate comprises polyvinyl chloride and a filler material; the method comprising the steps of:
mixing the polyvinyl chloride and a filler material, thereby obtaining a mixture;
extrusion of said mixture, thereby obtaining a substrate;
optionally, laminating said substrate to a top layer;
thereby obtaining a covering panel, wherein said filler material is mixed with said polyvinyl chloride in an amount from 30 to 50 wt. % based on the total weight of said mixture, wherein at least 95 wt. % of said filler material comprises a mixture of chalk and talc,
wherein the mixture of chalk and talc has a chalk to talc ratio of 8:1 to 1:1,
wherein said substrate further comprises a void volume from 30 vol. % to 70 vol. % determined according to ISO 4590, and
wherein the top layer is integrally attached to an upper surface of the substrate.

9. Process according to claim 8, whereby the surface of the extruded substrate is not subjected to a surface modification step prior to further processing.

10. Process according to claim 8, whereby said substrate is attached to said top layer at a temperature higher than the softening point but lower than the melt temperature of the principal polymer comprised in said substrate.

11. Process according to claim 8, whereby at least the surface of said substrate is reheated before attaching said substrate to said top layer.

12. Process according to claim 11, whereby said substrate and said top layer are subsequently subjected to a double stack lamination process.

13. Covering panel according to claim 1 having an E-modulus of 1200 MPa or higher.

14. Covering panel according to claim 1, wherein the top layer comprises a print layer and a wear layer.

15. Covering panel according to claim 14, wherein the wear layer is a transparent polyvinyl chloride.

16. Covering panel according to claim 1, wherein the void volume is from 45 vol. % to 60 vol. %.

* * * * *